United States Patent
Ooshima et al.

(10) Patent No.: US 12,129,927 B2
(45) Date of Patent: Oct. 29, 2024

(54) VALVE DEVICE AND METHOD FOR MANUFACTURING VALVE DEVICE

(71) Applicant: DENSO CORPORATION, Kariya (JP)

(72) Inventors: Tomio Ooshima, Kariya (JP); Shuuya Mikami, Kariya (JP); Noriyuki Inagaki, Kariya (JP)

(73) Assignee: DENSO CORPORATION, Kariya (JP)

( * ) Notice: Subject to any disclaimer, the term of this patent is extended or adjusted under 35 U.S.C. 154(b) by 28 days.

(21) Appl. No.: 17/980,658

(22) Filed: Nov. 4, 2022

(65) Prior Publication Data

US 2023/0175586 A1 Jun. 8, 2023

Related U.S. Application Data (63) Continuation of application No. PCT/JP2021/018042, filed on May 12, 2021.

(30) Foreign Application Priority Data

May 15, 2020 (JP) ................................ 2020-086237

(51) Int. Cl.
  *F16J 15/3204* (2016.01)
  *F16K 41/04* (2006.01)
(52) U.S. Cl.
  CPC ......... *F16J 15/3204* (2013.01); *F16K 41/043* (2013.01)

(58) Field of Classification Search
  CPC .... F16J 15/3204; F16J 15/322; F16J 15/3248; F16J 15/3252; F16J 15/3268; F16K 41/043
  See application file for complete search history.

(56) References Cited

U.S. PATENT DOCUMENTS

| | | | |
|---|---|---|---|
| 2015/0337963 A1* | 11/2015 | Fujii | F16J 15/322 277/573 |
| 2017/0175898 A1* | 6/2017 | Yoshino | F16J 15/3256 |

FOREIGN PATENT DOCUMENTS

| | | | |
|---|---|---|---|
| JP | S50-113339 | 9/1975 | |
| JP | 2010-65729 | 3/2010 | |
| JP | 2012-149725 | 8/2012 | |
| JP | 2014-105764 | 6/2014 | |
| JP | 5657824 B1 * | 1/2015 | ............. F16J 15/322 |
| JP | 2015-161334 | 9/2015 | |

\* cited by examiner

*Primary Examiner* — Gilbert Y Lee
(74) *Attorney, Agent, or Firm* — Nixon & Vanderhye P.C.

(57) ABSTRACT

A valve device includes: a housing; a valve element; a rotatable shaft that rotates the valve element; a seal member that is slidably in close contact with an outer peripheral surface of the rotatable shaft to limit penetration of gas through a gap between the rotatable shaft and the housing; and a mounting ring that is shaped in a ring form and mounts the seal member to the housing. The mounting ring has: a ring portion, a one-side plate portion and an opposite-side plate portion which are formed from a single continuous plate material. The one-side plate portion and the opposite-side plate portion clamp the seal member therebetween and are joined together through the ring portion.

8 Claims, 8 Drawing Sheets

VALVE DEVICE AND METHOD FOR MANUFACTURING VALVE DEVICE

CROSS REFERENCE TO RELATED APPLICATIONS

This application is a continuation application of International Patent Application No. PCT/JP2021/018042 filed on May 12, 2021, which designated the U.S. and claims the benefit of priority from Japanese Patent Application No. 2020-86237 filed on May 15, 2020. The entire disclosures of all of the above applications are incorporated herein by reference.

TECHNICAL FIELD

The present disclosure relates to a valve device and a method for manufacturing the valve device.

BACKGROUND

Previously, there has been proposed a valve device that includes: a seal member which limits penetration of gas through a gap between a rotatable shaft and a housing; and a mounting ring which mounts the seal member to the housing. The seal member is shaped in a plate form and has an opening that extends through the seal member and is configured to receive the rotatable shaft. The seal member is slidably in close contact with an outer peripheral surface of the rotatable shaft. The mounting ring is placed around the outer peripheral surface of the rotatable shaft. The mounting ring has an outer ring and an inner ring while the inner ring is located on an inner side of the outer ring. The outer ring includes: an outer cylindrical tubular portion which is shaped in a cylindrical tubular form; and an outer ring plate portion which inwardly extends from an end part of the outer cylindrical tubular portion in a radial direction of the rotatable shaft. The inner ring includes: an inner cylindrical tubular portion which is shaped in a cylindrical tubular form; and an inner ring plate portion which inwardly extends from an end part of the inner cylindrical tubular portion in the radial direction of the rotatable shaft.

SUMMARY

This section provides a general summary of the disclosure, and is not a comprehensive disclosure of its full scope or all of its features.

According to one aspect of the present disclosure, there is provided a valve device that includes a housing, a valve element, a rotatable shaft, a seal member and a a mounting ring. The housing has a gas flow passage and a receiving space formed at an inside of the housing. The valve element is installed at the gas flow passage and is configured to adjust an opening degree of the gas flow passage. The rotatable shaft is received in the receiving space and is configured to rotate about an axis of the rotatable shaft to rotate the valve element. The seal member is slidably in close contact with an outer peripheral surface of the rotatable shaft to limit penetration of the gas through a gap between the rotatable shaft and the housing. The mounting ring mounts the seal member to the housing. The mounting ring includes a ring portion, a one-side plate portion and an opposite-side plate portion which are formed from a single continuous plate material. The one-side plate portion and the opposite-side plate portion clamp the seal member therebetween and are joined together through the ring portion.

According to another aspect of the present disclosure, there is provided a method for manufacturing the valve device. The method includes: forming the one-side plate portion and a cylindrical tubular portion, which are joined together, by bending a plate material; and holding the seal member with the mounting ring by bending an entire circumferential region of the cylindrical tubular portion in a state where the outer peripheral end portion of the seal member is overlapped with a part of the one-side plate portion placed adjacent to the cylindrical tubular portion and thereby forming the ring portion and the opposite-side plate portion such that the seal member is clamped between the one-side plate portion and the opposite-side plate portion.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

Previously, there has been proposed a valve device that includes: a seal member which limits penetration of gas through a gap between a rotatable shaft and a housing; and a mounting ring which mounts the seal member to the housing. The seal member is shaped in a plate form and has an opening that extends through the seal member and is configured to receive the rotatable shaft. The seal member is slidably in close contact with an outer peripheral surface of the rotatable shaft. The mounting ring is placed around the outer peripheral surface of the rotatable shaft. The mounting ring has an outer ring and an inner ring while the inner ring is located on an inner side of the outer ring. The outer ring includes: an outer cylindrical tubular portion which is shaped in a cylindrical tubular form; and an outer ring plate portion which inwardly extends from an end part of the outer cylindrical tubular portion in a radial direction of the rotatable shaft. The inner ring includes: an inner cylindrical tubular portion which is shaped in a cylindrical tubular form; and an inner ring plate portion which inwardly extends from an end part of the inner cylindrical tubular portion in the radial direction of the rotatable shaft.

The outer cylindrical tubular portion is press-fitted to and is thereby fixed to an inner wall surface of the housing which forms a receiving space that receives the rotatable shaft. The inner cylindrical tubular portion is fixed to an inner peripheral surface of the outer cylindrical tubular portion by swaging. The seal member is clamped between the outer ring plate portion and the inner ring plate portion in an axial direction of the rotatable shaft. The mounting ring assembles the seal member to the housing in the above-described manner.

In the above-described valve device, the mounting ring is made of the two components, i.e., the inner ring and the outer ring. Furthermore, in the above-described valve device, it is required to provide the fixing portion, at which the inner ring and the outer ring are fixed together, at the location that is axially adjacent to the holding portion for holding the seal member in the axial direction of the rotatable shaft. This results in an increase in a size of the mounting ring measured in the axial direction of the rotatable shaft. The holding portion, which clamps and thereby holds the seal member therebetween, includes the outer ring plate portion and the inner ring plate portion. The fixing portion, at which the inner ring and the outer ring are fixed together, includes the contact portion, at which the inner cylindrical tubular portion and the part of the outer cylindrical tubular portion contact with each other.

According to one aspect of the present disclosure, there is provided a valve device including:
- a housing that has a gas flow passage and a receiving space formed at an inside of the housing, wherein the gas flow passage is configured to conduct gas, and the receiving space is communicated with the gas flow passage;
- a valve element that is installed at the gas flow passage and is configured to adjust an opening degree of the gas flow passage;
- a rotatable shaft that is received in the receiving space and is configured to rotate about an axis of the rotatable shaft to rotate the valve element;
- a seal member that is placed around an outer peripheral surface of the rotatable shaft in the receiving space and is slidably in close contact with the outer peripheral surface of the rotatable shaft to limit penetration of the gas through a gap between the rotatable shaft and the housing; and
- a mounting ring that is shaped in a ring form and is placed around the outer peripheral surface of the rotatable shaft in the receiving space to mount the seal member to the housing, wherein:
  an outer peripheral end portion of the seal member is shaped in a planar plate form and extends from an inner side, at which the rotatable shaft is placed, toward an outer side in a radial direction of the rotatable shaft;
  the mounting ring, which is shaped in the ring form, has an inner peripheral surface and an outer peripheral surface and also has:
    a ring portion which is placed around an outer peripheral end of the seal member;
    a one-side plate portion which is shaped in a plate form and is joined to one end part of the ring portion located on one side in an axial direction of the rotatable shaft while the one-side plate portion extends from the ring portion toward the inner side in the radial direction; and
    an opposite-side plate portion which is shaped in a plate form and is joined to an opposite end part of the ring portion located on an opposite side that is opposite to the one end part in the axial direction while the opposite-side plate portion extends from the ring portion toward the inner side in the radial direction;
  the outer peripheral end portion of the seal member is clamped between the one-side plate portion and the opposite-side plate portion in the axial direction;
  the ring portion is fixed to an inner wall surface of the housing which forms the receiving space; and
  the ring portion, the one-side plate portion and the opposite-side plate portion are formed from a single continuous plate material.

According to the above aspect, the ring portion, the one-side plate portion and the opposite-side plate portion are formed from the single component. Therefore, the number of the components can be reduced in comparison to the previously proposed mounting ring.

Furthermore, according to the above aspect, the one-side plate portion and the opposite-side plate portion are joined together through the ring portion. The ring portion is located between the one-side plate portion and the opposite-side plate portion in the axial direction of the rotatable shaft. Therefore, it is not required to provide the fixing portion of the previously proposed mounting ring, at which the inner ring and the outer ring are fixed together, at the location that is axially adjacent to the holding portion which claims and holds the seal member in the axial direction. Thus, the length of the mounting ring in the axial direction can be reduced in comparison to the previously proposed mounting ring.

Hereinafter, embodiments of the present disclosure will be described with reference to the drawings. In each of the following embodiments, portions, which are the same or equivalent to each other, will be indicated by the same reference signs.

First Embodiment

Figure 1:
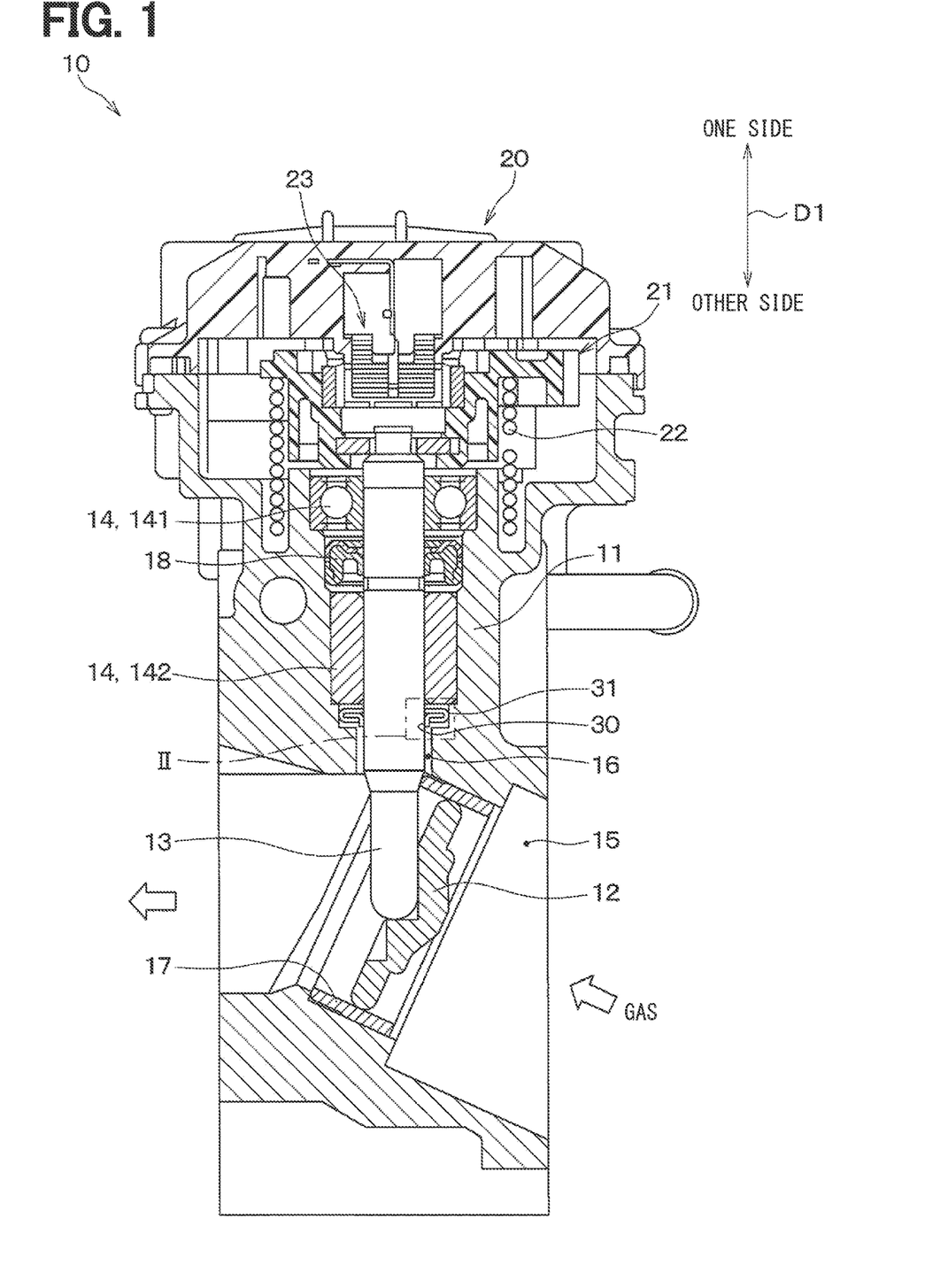
FIG. 1 is a cross-sectional view of a valve device of a first embodiment.

A valve device 10 of the present embodiment shown in FIG. 1 is used for an EGR device (i.e., an exhaust gas recirculation device) that recirculates exhaust gas of an internal combustion engine to an intake air passage of the internal combustion engine. The valve device 10 increases or decreases a flow rate of the exhaust gas of the internal combustion engine flowing toward the intake air passage of the internal combustion engine. The valve device 10 includes a housing 11, a valve element 12, a rotatable shaft 13 and a bearing 14.

The housing 11 has a gas flow passage 15 and a receiving space 16 which are formed at an inside of the housing 11. The gas flow passage 15 conducts the gas, and the receiving space 16 receives the rotatable shaft 13. The gas, which flows in the gas flow passage 15, is the exhaust gas of the internal combustion engine flowing toward the intake air passage of the internal combustion engine. The gas flow passage 15 is an internal space of the housing 11. The gas flow passage 15 is formed mainly by an inner wall surface of the housing 11. The receiving space 16 is communicated with the gas flow passage 15. The receiving space 16 is formed by an inner wall surface of the housing 11. The housing 11 is made of a metal material, such as an aluminum alloy.

A nozzle 17, which is shaped in a tubular form, is securely press fitted to the inner wall surface of the housing 11 that forms the gas flow passage 15. An internal space of the nozzle 17 forms a part of the gas flow passage 15. The nozzle 17 is made of a material (e.g., stainless steel) which has excellent heat resistance and excellent corrosion resistance.

The valve element 12 is placed in the gas flow passage 15. The valve element 12 is configured to adjust an opening degree of the gas flow passage 15. The valve element 12 is a butterfly valve which is shaped in a circular disk form. The valve element 12 is received in an internal space of the nozzle 17.

The rotatable shaft 13 is placed in the receiving space 16. The rotatable shaft 13 is rotated about an axis of the rotatable shaft 13 to rotate the valve element 12. The rotatable shaft 13 is fixed to the valve element 12 such that the axis of the rotatable shaft 13 is tilted relative to a diameter direction of the valve element 12. The rotatable shaft 13 is made of a material (e.g., stainless steel) which has excellent heat resistance and excellent corrosion resistance.

The bearing 14 is received in the receiving space 16. The bearing 14 rotatably supports the rotatable shaft 13. The bearing 14 is arranged not on both sides of the gas flow passage 15 but on only one side of the gas flow passage 15. The bearing 14 includes a rolling bearing 141 (e.g., a ball bearing or a roller bearing) and a sliding bearing 142 (e.g., a metal bearing). The sliding bearing 142 is located on a side of the rolling bearing 141 where the gas flow passage 15 is placed.

Furthermore, the valve device 10 includes an oil seal 18. The oil seal 18 is placed in the receiving space 16 at a location between the rolling bearing 141 and the sliding bearing 142 in an axial direction D1 of the rotatable shaft 13. The oil seal 18 limits penetration of the exhaust gas through a gap between the rotatable shaft 13 and the inner wall surface of the housing 11, which forms the receiving space 16.

Furthermore, the valve device 10 includes an electric actuator 20. The electric actuator 20 drives the rotatable shaft 13. The electric actuator 20 is installed in the housing 11. The electric actuator 20 includes an electric motor (not shown), a gear speed reducer 21, a coil spring 22 and an opening degree sensor 23. The electric motor generates a rotational drive force when the electric motor is energized. The gear speed reducer amplifies a rotational torque of the electric motor and transmits the amplified rotational torque to the rotatable shaft 13. The coil spring 22 urges the valve element 12 in a valve opening direction or a valve closing direction. The opening degree sensor 23 senses an opening degree of the valve element 12 through the rotatable shaft 13.

Furthermore, the valve device 10 includes a seal member 30 and a mounting ring 31. The seal member 30 and the mounting ring 31 are placed in the receiving space 16 such that the seal member 30 and the mounting ring 31 are placed around an outer peripheral surface of the rotatable shaft 13. The seal member 30 and the mounting ring 31 are located on the side of the bearing 14 where the gas flow passage 15 is placed. The seal member 30 is slidably in close contact with the outer peripheral surface of the rotatable shaft 13, so that the seal member 30 limits the penetration of the exhaust gas through a gap between the rotatable shaft 13 and the inner wall surface of the housing 11, which forms the receiving space 16.

Figure 2:
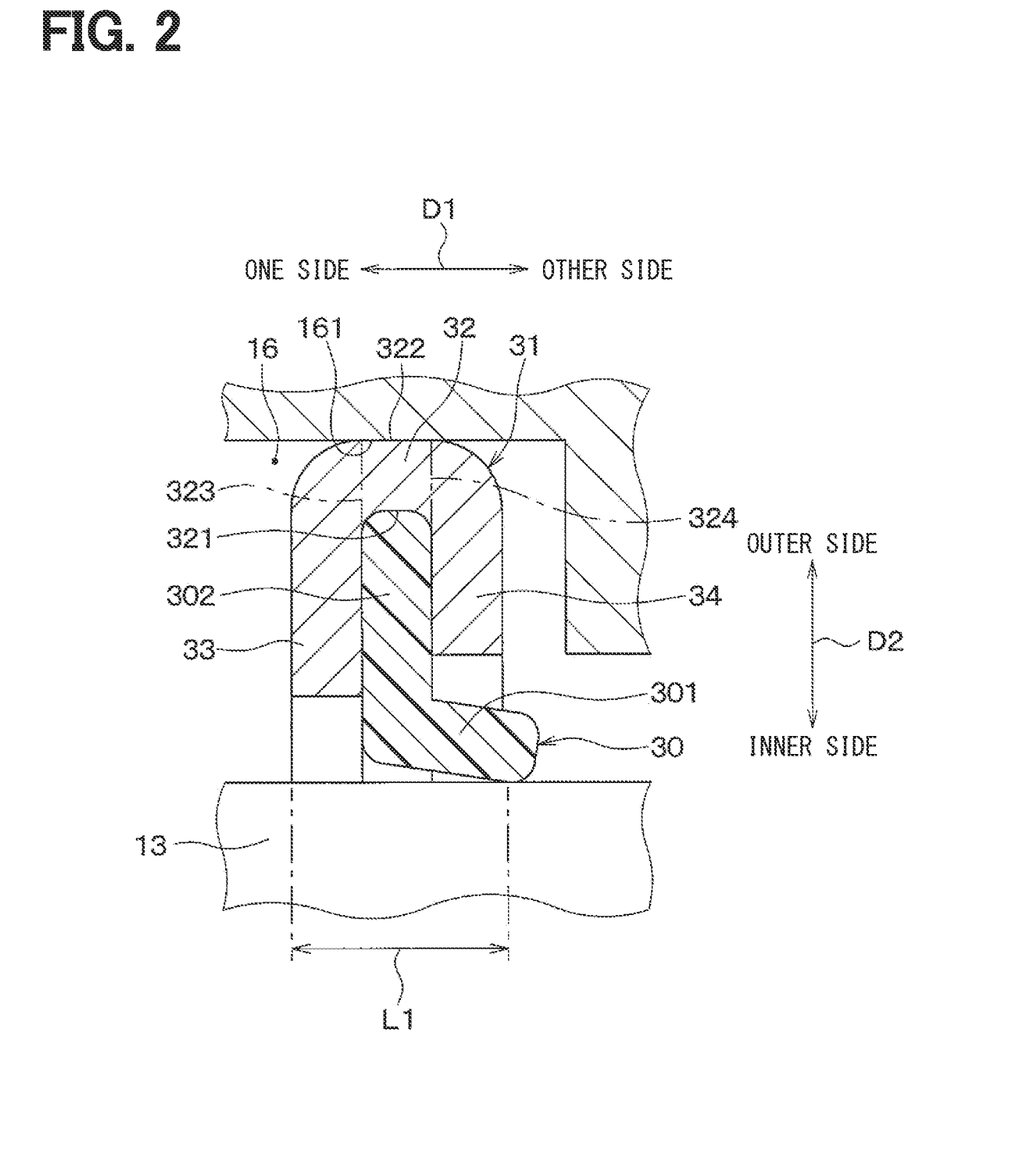
FIG. 2 is an enlarged view of a portion II in FIG. 1.

As shown in FIG. 2, the seal member 30 has an opening which extends through a center of the seal member 30 and receives the rotatable shaft 13. The seal member 30 is shaped in a plate form and outwardly extends from the rotatable shaft 13 in a radial direction D2 of the rotatable shaft 13. In the present embodiment, a shape, which is formed by an outer peripheral end (also referred to as an outer periphery) of the seal member 30 in a circumferential direction thereof, is a circle.

More specifically, the seal member 30 is bent such that an inner peripheral end portion 301 of the seal member 30 is faced toward the gas flow passage 15. That is, the seal member 30 is bent such that the inner peripheral end portion 301 of the seal member 30 is located on the gas flow passage 15 side of an outer peripheral end portion 302 of the seal member 30 in the axial direction D1. The other side in the axial direction D1 shown in FIG. 2 is the gas flow passage 15 side. The inner peripheral end portion 301 is slidably in close contact with the outer peripheral surface of the rotatable shaft 13. The outer peripheral end portion 302 is shaped in a planar plate form that extends in the radial direction D2 such that the outer peripheral end portion 302 extends from the rotatable shaft 13 side toward the outer side in the radial direction D2. Here, it should be noted that the seal member 30 may not be bent.

The seal member 30 is made of polytetrafluoroethylene (PTFE) which is the fluorocarbon resin. The seal member 30 may be made of another type of fluorocarbon resin which is other than the PTFE.

The mounting ring 31 is a ring-shaped member that mounts the seal member 30 to the housing 11. The mounting ring 31 is fixed to the housing 11 in a state where the mounting ring 31 is press-fitted to the inner peripheral surface of the housing 11 which forms the receiving space 16. The mounting ring 31 is made of stainless steel that is a metal material which has corrosion resistance. The mounting ring 31 may be made of any other metal material which is other than the stainless steel. More specifically, the mounting ring 31 has a ring portion 32, a one-side plate portion 33 and an opposite-side plate portion 34.

The ring portion 32 is shaped in a ring form and has an inner peripheral surface 321 and an outer peripheral surface 322. The inner peripheral surface 321 defines an internal space of the ring portion 32. The outer peripheral surface 322 forms an outer contour of the ring portion 32. An axial direction of the ring portion 32 coincides with the axial direction D1 of the rotatable shaft 13.

The ring portion 32 is placed around the outer peripheral end of the seal member 30. The inner peripheral surface 321 is opposed to the outer peripheral end of the seal member 30 in the radial direction D2. A diameter of the inner peripheral surface 321 is the same as an outer diameter of the seal member 30. Therefore, the inner peripheral surface 321 is in contact with the outer peripheral end of the seal member 30. Here, it should be understood that the diameter of the inner peripheral surface 321 may be larger than the outer diameter of the seal member 30.

An entire axial region of the outer peripheral surface 322, which extends in the axial direction D1, is a cylindrical surface that has a constant diameter. That is, the entire axial region of the outer peripheral surface 322, which extends in the axial direction D1, has a shape that is the same as a shape of a peripheral surface of a cylinder having a constant diameter. As shown in FIG. 2, in a cross-section of the mounting ring 31 taken along a plane, which extends along the axis of the mounting ring 31 and is parallel with the axis of the mounting ring 31, a line, which is formed by the outer peripheral surface 322, is entirely a straight line that is parallel with the axial direction D1. The ring portion 32 is fixed to the inner wall surface 161 of the housing 11 which forms the receiving space 16. An entire circumferential region of the outer peripheral surface 322 is in surface-to-surface contact with the inner wall surface 161 which forms the receiving space 16.

The one-side plate portion 33 is continuous with an entire circumferential region of one end part 323 of the ring portion 32 located on the one side in the axial direction D1. The one-side plate portion 33 is shaped in a plate form that extends in the radial direction D2 such that the one-side plate portion 33 extends from the ring portion 32 toward the rotatable shaft 13 in the radial direction D2. The opposite-side plate portion 34 is continuous with an entire circumferential region of an opposite end part 324 of the ring portion 32 located on the other side in the axial direction D1. The opposite-side plate portion 34 is shaped in a plate form that extends in the radial direction D2 such that the opposite-side plate portion 34 extends from the ring portion 32 toward the rotatable shaft 13 in the radial direction D2. The outer peripheral end portion 302 of the seal member 30 is clamped between the one-side plate portion 33 and the opposite-side plate portion 34 in the axial direction D1.

The ring portion 32, the one-side plate portion 33 and the opposite-side plate portion 34 are formed from a single continuous plate material. A cross-section of this single continuous plate material, which is taken along a plane that extends through the axis of the rotatable shaft 13 and is parallel with the axial direction D1, has a U-shape.

Figure 3A:
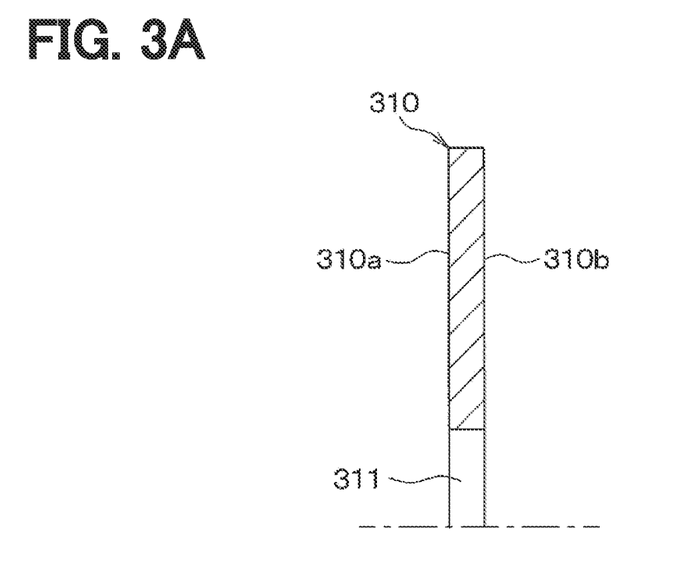
FIG. 3A is a cross-sectional view of a plate material, showing a part of a manufacturing process of the valve device according to the first embodiment.
Figure 3B:
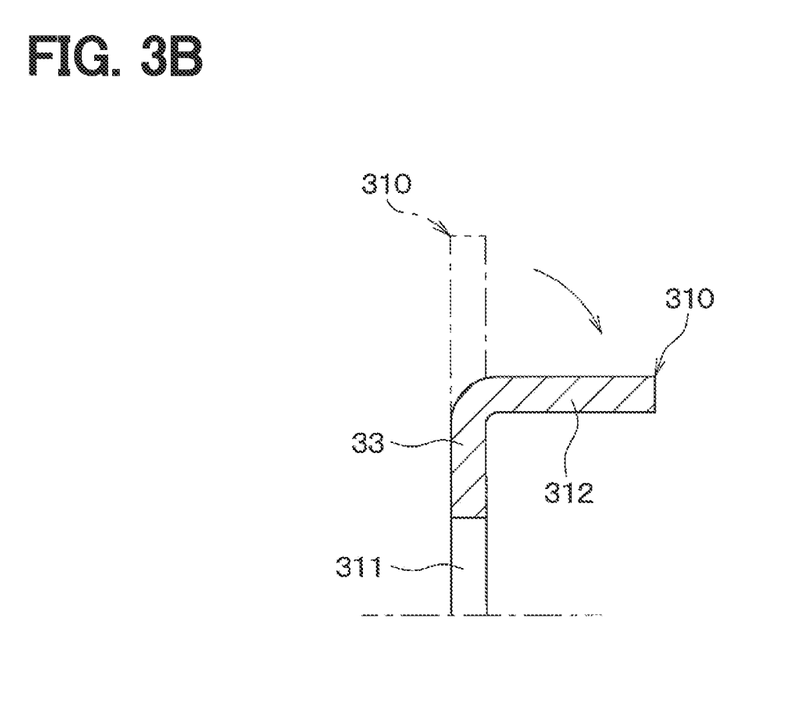
FIG. 3B is a cross-sectional view of the plate material, showing another part of the manufacturing process of the valve device according to the first embodiment.
Figure 3C:
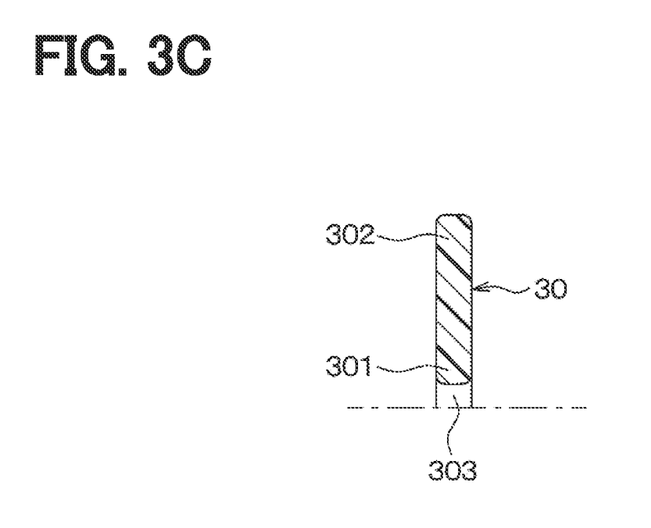
FIG. 3C is a cross-sectional view of a seal member, showing another part of the manufacturing process of the valve device according to the first embodiment.
Figure 3D:
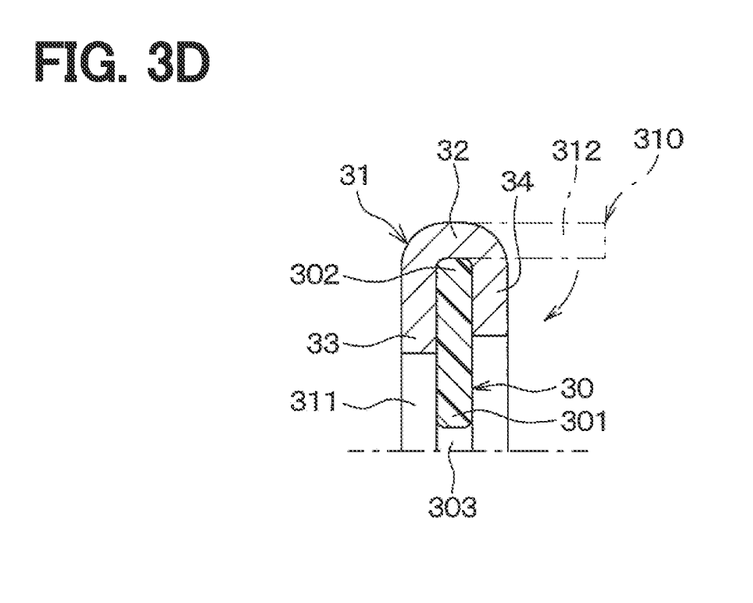
FIG. 3D is a cross-sectional view of the seal member and a mounting ring, showing another part of the manufacturing process of the valve device according to the first embodiment.

Next, the method for manufacturing the valve device 10 of the present embodiment will be described. The method for manufacturing the valve device 10 includes:

preparing a plate material 310 that is a member for forming the mounting ring 31, as shown in FIG. 3A;
forming a cylindrical tubular portion 312, as shown in FIG. 3B; and
preparing the seal member 30 as shown in FIG. 3C, and holding the seal member 30 with the mounting ring 31, as shown in FIG. 3D.

As shown in FIG. 3A, the plate material 310, which is prepared in the preparing of the plate material 310, is shaped in a circular planar plate form and has a pair of major surfaces 310a, 310b. The plate material 310 has an opening 311 that extends through a center of the plate material 310 and is configured to receive the rotatable shaft 13.

As shown in FIG. 3B, in the forming of the cylindrical tubular portion 312, an outer peripheral end portion of the plate material 310, which is indicated by a dot-dash line, is bent into a cylindrical tubular form by a press-drawing process (serving as a bending process), as indicated by an arrow in FIG. 3B. Therefore, the one-side plate portion 33 and the cylindrical tubular portion 312 are formed, as indicated by a solid line.

As shown in FIG. 3C, the seal member 30, which is prepared in the preparing of the seal member 30, is shaped in a circular planar plate form and has a pair of major surfaces. The seal member 30 has an opening 303 that extends through a center of the seal member 30 and is configured to receive the rotatable shaft 13. At this time, the inner peripheral end portion 301 extends in parallel with the outer peripheral end portion 302.

As shown in FIG. 3D, in the holding of the seal member 30 with the mounting ring 31, the outer peripheral end portion 302 of the seal member 30 is overlapped with the cylindrical tubular portion 312 of the one-side plate portion 33. In this state, an entire circumferential region of a part of the cylindrical tubular portion 312, which is spaced away from the one-side plate portion 33, is bent by the press-drawing process (serving as the bending process). Therefore, the ring portion 32 and the opposite-side plate portion 34 are formed. The seal member 30 is clamped between the one-side plate portion 33 and the opposite-side plate portion 34.

As described above, the ring portion 32 and the opposite-side plate portion 34 are formed by performing the easy bending process called the press-drawing process on the plate material 310, and thereby the seal member 30 is clamped between the one-side plate portion 33 and the opposite-side plate portion 34. The bending process, which is performed at the time of forming the opposite-side plate portion 34 by bending the cylindrical tubular portion 312, may be performed by a spin swaging process. The spin swaging process is a process of bending a workpiece with a punch while spinning one of the workpiece and the punch. Even with this easy bending process called the spin swaging process, the seal member 30 can be clamped between the one-side plate portion 33 and the opposite-side plate portion 34.

Further, the method for manufacturing the valve device 10 includes: assembling the mounting ring 31 to the housing 11 by press-fitting the mounting ring 31, which holds the seal member 30, to the housing 11; and assembling the rotatable shaft 13 to the housing 11.

In the assembling of the mounting ring 31 to the housing 11, as shown in FIG. 2, the mounting ring 31 is press-fitted to the inner wall surface 161 of the housing 11 which forms the receiving space 16. Therefore, the mounting ring 31 is fixed to the housing 11.

In the assembling of the rotatable shaft 13 to the housing 11, as shown in FIG. 1, the rotatable shaft 13 is inserted into the receiving space 16 toward the gas flow passage 15 from the opposite side of the receiving space 16 which is opposite to the gas flow passage 15. The rotatable shaft 13 is inserted into the opening 303 of the seal member 30 shown in FIG. 3D. At this time, a diameter of the opening 303 of the seal member 30 is smaller than a diameter of a portion of the rotatable shaft 13 around which the seal member 30 is installed. Therefore, the inner peripheral end portion 301 of the seal member 30 is urged toward the gas flow passage 15. Therefore, as shown in FIG. 2, the inner peripheral end portion 301 of the seal member 30 is bent such that the inner peripheral end portion 301 is directed toward the gas flow passage 15. The seal member 30 is assembled to the rotatable shaft 13 in the above-described manner.

Figure 4:
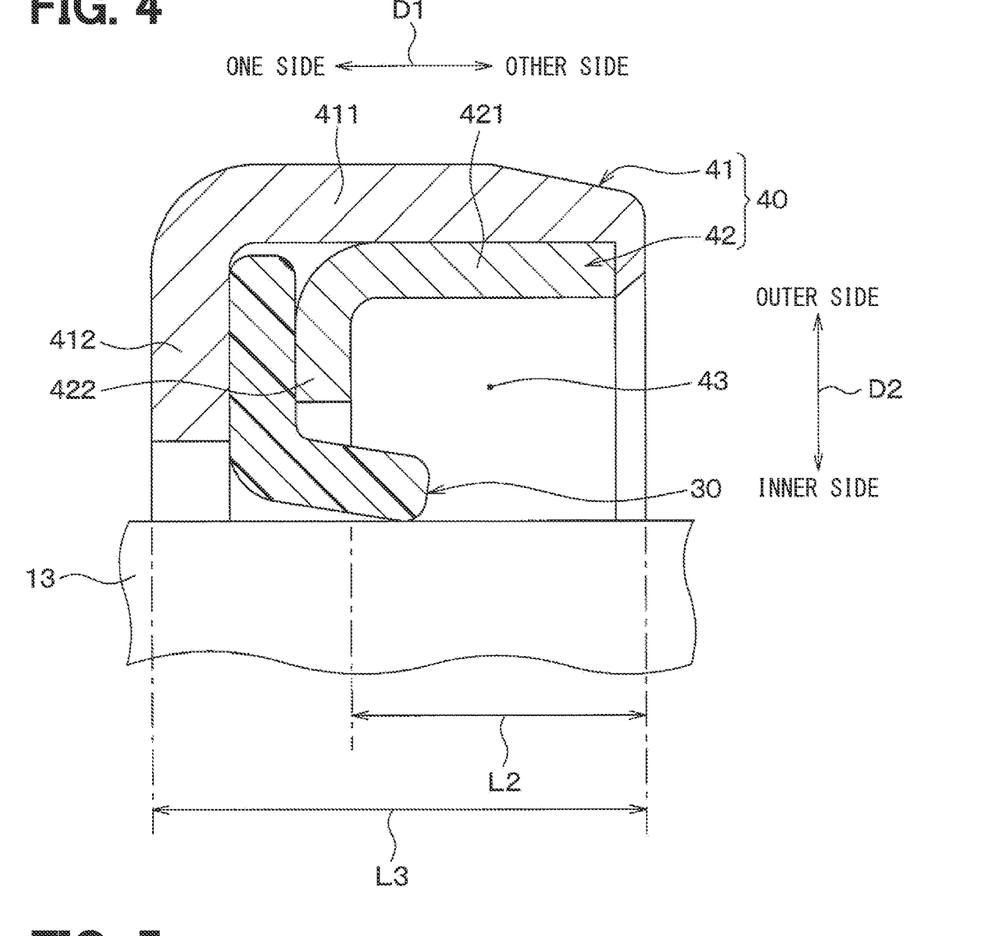
FIG. 4 is a cross-sectional view showing a part of a valve device of a first comparative example, corresponding to FIG. 2.

In the following description, the mounting ring 31 of the present embodiment and a mounting ring 40 of a first comparative example shown in FIG. 4 are compared. The mounting ring 40 of the first comparative example corresponds to a mounting ring of a valve device according to the previously proposed technique described above. The mounting ring 40 of the first comparative example has an outer ring 41 and an inner ring 42. The outer ring 41 is an outer ring member of the mounting ring 40. The inner ring 42 is an inner ring member which is located on an inner side of the outer ring 41.

The outer ring 41 has an outer cylindrical tubular portion 411 and an outer ring plate portion 412. The outer cylindrical tubular portion 411 is shaped in a cylindrical tubular form and extends in the axial direction D1 of the rotatable shaft 13. The outer ring plate portion 412 is shaped in a plate form and extends from one end part of the outer cylindrical tubular portion 411, which faces in the axial direction D1, toward an inner side in the radial direction D2 of the rotatable shaft 13.

The inner ring 42 has an inner cylindrical tubular portion 421 and an inner ring plate portion 422. The inner cylindrical tubular portion 421 is shaped in a cylindrical tubular form and extends in the axial direction D1 of the rotatable shaft 13. The inner ring plate portion 422 is shaped in a plate form and extends from one end part of the inner cylindrical tubular portion 421, which faces in the axial direction D1, toward an inner side in the radial direction D2 of the rotatable shaft 13.

The outer cylindrical tubular portion 411 is press-fitted to and is thereby fixed to the inner wall surface of the housing 11 which forms the receiving space 16. The inner cylindrical tubular portion 421 is fixed to the inner peripheral surface of the outer cylindrical tubular portion 411 by swaging. The seal member 30 is clamped between the outer ring plate portion 412 and the inner ring plate portion 422 in the axial direction D1. The mounting ring 40 assembles the seal member 30 to the housing 11 in the above-described manner.

The mounting ring 40 of the first comparative example is formed by the two components, i.e., the outer ring 41 and the inner ring 42. In contrast, the mounting ring 31 of the present embodiment is formed by the one component, and thereby the number of the components of the mounting ring 31 of the present embodiment is reduced in comparison to the number of components of the mounting ring 40 of the first comparative example.

Furthermore, in the mounting ring 40 of the first comparative example, it is required to provide the fixing portion, at which the inner ring 42 and the outer ring 41 are fixed together, at a location that is axially adjacent to the holding portion for holding the seal member 30 in the axial direction D1. This results in an increase in a length L3 of the mounting ring 40 measured in the axial direction D1. The holding portion, which clamps and thereby holds the seal member 30 therebetween, includes the outer ring plate portion 412 and the inner ring plate portion 422. The fixing portion, at which the inner ring 42 and the outer ring 41 are fixed together, includes a contact portion, at which the inner cylindrical tubular portion 421 and the part of the outer cylindrical tubular portion 411 contact with each other.

Furthermore, in the mounting ring 40 of the first comparative example, a large dead space 43 is formed between the inner cylindrical tubular portion 421 and the rotatable shaft 13. Condensed water, foreign objects or the like, which are contained in the exhaust gas, may be accumulated in this dead space 43. In such a case, the mounting ring 40, the seal member 30, and the rotatable shaft 13 may be corroded. Furthermore, the rotatable shaft 13 may be locked by the accumulated foreign objects.

In contrast, as shown in FIG. 2, in the mounting ring 31 of the present embodiment, the one-side plate portion 33 and the opposite-side plate portion 34 are joined together through the ring portion 32. The one-side plate portion 33 and the opposite-side plate portion 34 are the holding portions, which clamp and thereby hold the seal member 30 therebetween. The ring portion 32 is located between the one-side plate portion 33 and the opposite-side plate portion 34 in the axial direction D1. Therefore, the fixing portion of the mounting ring 40 of the first comparative example, which fixes the inner ring 42 to the outer ring 41, is unnecessary. Thus, a length L1 of the mounting ring 31, which is measured in the axial direction D1, can be reduced from the length L3 of the mounting ring 40 of the first comparative example, which is measured in the axial direction D1, by a length L2 of the fixing portion of the mounting ring 40, which is measured in the axial direction D1. Furthermore, the mounting ring 31 of the present embodiment does not have the inner cylindrical tubular portion 421. Therefore, a size of the dead space between the mounting ring 31 and the rotatable shaft 13 can be reduced. Thus, it is possible to limit an occurrence of a disadvantage caused by the accumulation of the condensed water and the foreign objects contained in the exhaust gas in the dead space.

As described above, according to the present embodiment, it is possible to provide the valve device 10 that can reduce the number of the components of the mounting ring 31 and the size of the mounting ring 31 measured in the axial direction.

Furthermore, in the valve device 10 of the present embodiment, the entire axial region of the outer peripheral surface 322 of the ring portion 32 in the axial direction D1 forms the cylindrical surface. The mounting ring 31 is fixed to the housing 11 in the state where the entire circumferential region of this cylindrical surface is in surface-to-surface contact with the inner wall surface 161 of the housing 11 which forms the receiving space 16. Therefore, the degree of sealing between the mounting ring 31 and the housing 11 can be improved in comparison to a case where the outer peripheral surface 322 is in line contact with the inner wall surface 161.

The entire axial region of the outer peripheral surface 322 in the axial direction D1 does not have to be the cylindrical surface. Only an axial portion of the outer peripheral surface 322 in the axial direction D1 may be a cylindrical surface. Even in this case, when the entire circumferential region of this cylindrical surface is brought into surface-to-surface contact with the inner wall surface 161, the degree of sealing between the mounting ring 31 and the housing 11 can be improved in comparison to the case where the outer peripheral surface 322 is in line contact with the inner wall surface 161.

Second Embodiment

The present embodiment differs from the first embodiment with respect to the shape of the plate material 310 prepared for forming the mounting ring 31 in the method for manufacturing the valve device 10.

Figure 5:
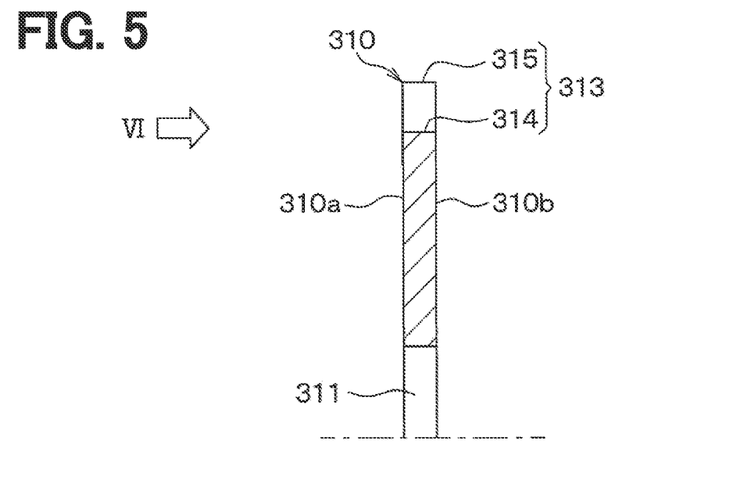
FIG. 5 is a cross-sectional view of a plate material, showing a part of a manufacturing process of a valve device according to a second embodiment.
Figure 6:
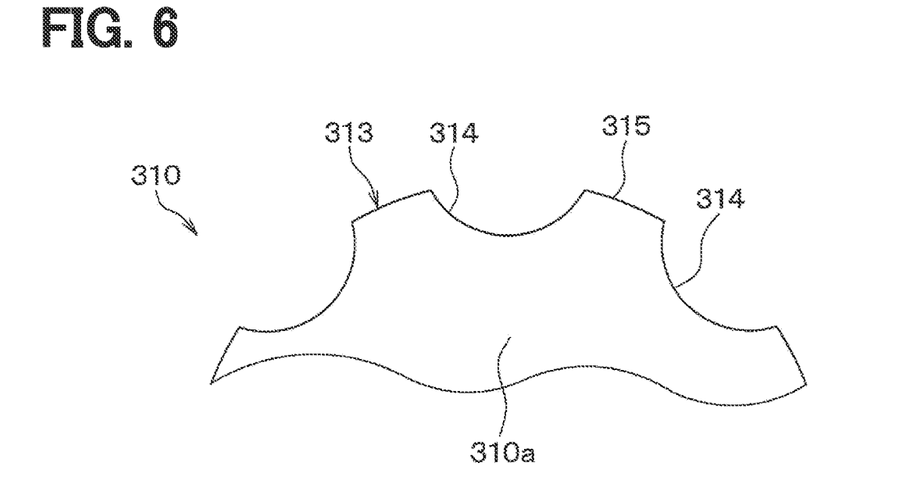
FIG. 6 is a view of the plate material taken in a direction of an arrow VI in FIG. 5.

Specifically, as shown in FIG. 5, the plate material 310, which is prepared in the preparing of the plate material 310, is shaped in a planar plate form and has the pair of major surfaces 310a, 310b. The opening 311 extends through a center of the plate material 310. As shown in FIG. 6, an outer peripheral end of each of the pair of major surfaces 310a, 310b has a plurality of recesses 314 which are arranged and are spaced from each other in a circumferential direction of the outer peripheral end 313. FIG. 6 shows only the major surface 310a, which is the one of the pair of major surfaces 310a, 310b. Each of the recesses 314 is recessed toward a center of the major surface 310a, 310b. More specifically, the outer peripheral end 313 of each of the pair of major surfaces 310a, 310b has a plurality of arcuate portions 315, which are located along an imaginary circle, and a plurality of recesses 314, which are located on the center side of the imaginary circle where the center of the imaginary circle is placed. The arcuate portions 315 and the recesses 314 are alternately arranged in the circumferential direction.

Thereafter, like in the first embodiment, the forming of the cylindrical tubular portion 312 shown in FIG. 3B, the preparing of the seal member 30 shown in FIG. 3C and the holding of the seal member 30 with the mounting ring 31 shown in FIG. 3D are executed.

Therefore, a volume of the plate material 310 is reduced in comparison to the case where the plurality of recesses are not formed at the plate material 310. The case where the plurality of recesses are not formed at the plate material 310 is the case where the plate material 310 is shaped in the planar plate form. Therefore, as shown in FIG. 3D, it is possible to limit generation of wrinkles on the opposite-side plate portion 34 when the cylindrical tubular portion 312 is bent by the press drawing. In order to limit the generation of the wrinkles, it is preferable that the plurality of recesses 314 are arranged at equal intervals.

As a method of reducing the volume of the plate material 310, it is conceivable to arrange a plurality of recesses on each of the pair of major surfaces. Specifically, it is conceivable to reduce the material of the plate material 310 in the thickness direction of the plate material 310.

However, in this case, when the seal member 30 is clamped between the one-side plate portion 33 and the opposite-side plate portion 34 after forming the opposite-side plate portion 34 by bending the plate material 310, a load, which is applied from the opposite-side plate portion 34 to the seal member 30, is reduced. Therefore, there is a possibility that the opposite-side plate portion 34 returns to the side spaced away from the seal member 30. Thus, as the method of reducing the volume of the plate material 310, it is preferred to arrange the plurality of recesses along the outer peripheral end of each of the pair of major surfaces.

Third Embodiment

The present embodiment differs from the first embodiment with respect to the shape of the plate material 310 at the time of forming the mounting ring 31 in the method for manufacturing the valve device 10.

Figure 7:
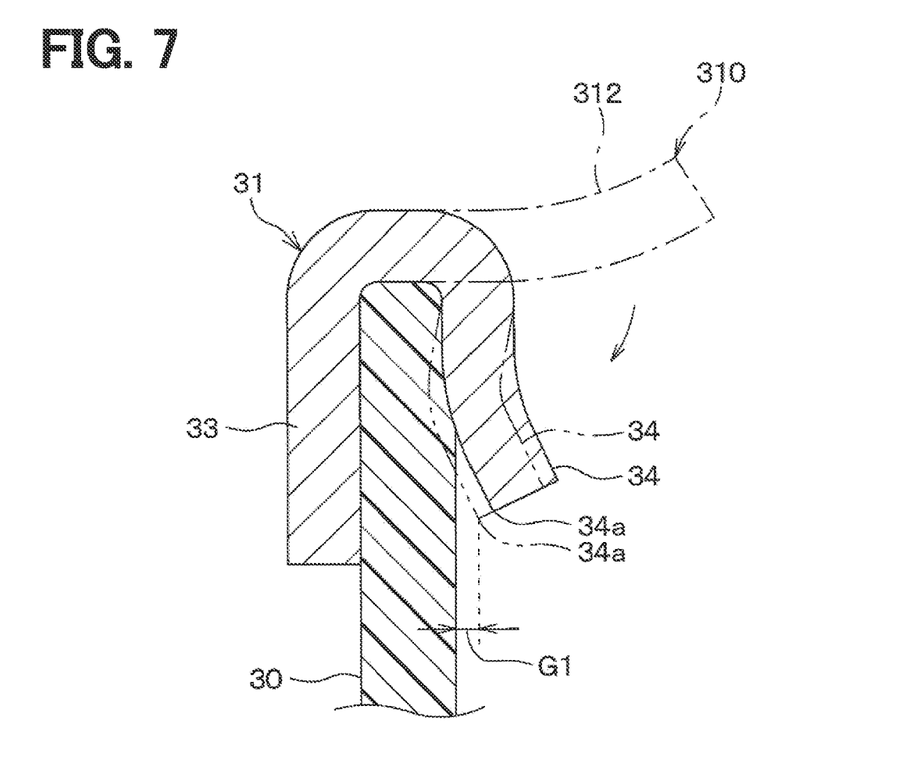
FIG. 7 is a cross-sectional view of a seal member and a plate material, showing a part of a manufacturing process of a valve device according to a third embodiment.

Specifically, the forming of the cylindrical tubular portion 312 includes forming the cylindrical tubular portion 312 in a curved form such that a diameter of each of the inner peripheral surface and the outer peripheral surface of the cylindrical tubular portion 312 is progressively increased in a direction away from the one-side plate portion 33, as indicated by a dot-dash line in FIG. 7.

In the holding of the seal member 30 with the mounting ring 31, a part of the cylindrical tubular portion 312, which is spaced away from the one-side plate portion 33, is bent while maintaining the curved form thereof and is urged against the seal member 30, as indicated by a dot-dot-dash line in FIG. 7. When this bending process is finished, springback occurs as indicated by a solid line in FIG. 7. Specifically, the bent part of the cylindrical tubular portion 312 is slightly returned toward the opposite side that is opposite to the bending direction. Therefore, the part of the cylindrical tubular portion 312, which is spaced away from the one-side plate portion 33, is bent such that the amount of compression of the seal member 30 becomes larger than the required amount of compression of the seal member 30 in consideration of the springback generated after the bending process.

Here, unlike the present embodiment, the diameter of each of the inner peripheral surface and the outer peripheral surface of the cylindrical tubular portion 312 may be set to be constant. In this case, in the holding of the seal member 30 with the mounting ring 31, when the cylindrical tubular portion 312 is bent in consideration of the spring back, the end part of the opposite-side plate portion 34 is urged against the seal member 30. Therefore, the seal member 30 may possibly be damaged by the end part of the opposite-side plate portion 34.

In contrast, according to the present embodiment, the part of the cylindrical tubular portion 312, which later becomes the opposite-side plate portion 34, is bent while maintaining the curved shape thereof. Thus, a gap G1 between an end part 34a of the opposite-side plate portion 34 and the seal member 30 can be ensured even when the cylindrical tubular portion 312 is bent in consideration of the springback. Specifically, the cylindrical tubular portion 312 is bent to form the opposite-side plate portion 34, and the seal member 30 is clamped between the opposite-side plate portion 34 and the one-side plate portion 33. At this time, the opposite-side plate portion 34 is urged against the seal member 30 in the state where the opposite-side plate portion 34 is curved to place the end part 34a of the opposite-side plate portion 34 spaced away from the seal member 30. Therefore, it is possible to limit the damage of the seal member 30, which is otherwise caused by the contact of the end part 34a of the opposite-side plate portion 34 to the seal member 30.

Fourth Embodiment

Figure 8:
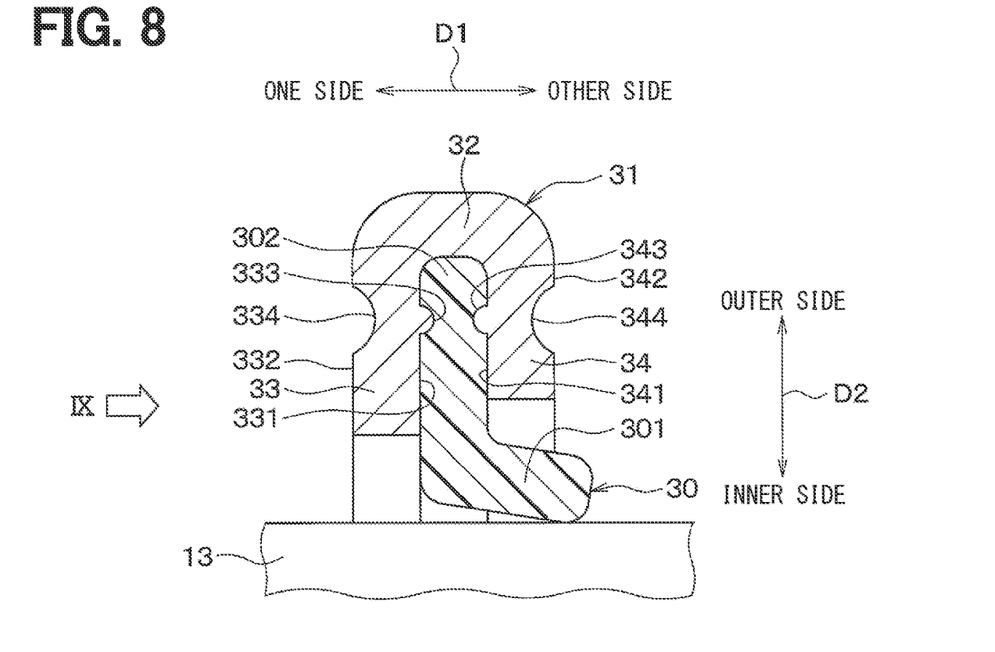
FIG. 8 is a cross-sectional view of a seal member and a mounting ring according to a fourth embodiment.

As shown in FIG. 8, in the present embodiment, each of the one-side plate portion 33 and the opposite-side plate portion 34 of the mounting ring 31 has a single projection 333, 343 at a surface 331, 341 thereof, which is located on the side where the seal member 30 is placed. The projections 333, 343 are formed at the plate material 310, which is shaped in the planar plate form shown in FIG. 3A. A recess 334, 343 is formed at a surface 332, 342 of each of the one-side plate portion 33 and the opposite-side plate portion 34, which is opposite to the seal member 30, by urging a punch against the surface 332, 342. Therefore, the projection 333, 343 is formed at the surface of each of the one-side plate portion 33 and the opposite-side plate portion 34 of the plate material 310, which is located on the side where the seal member 30 is placed.

Figure 9:
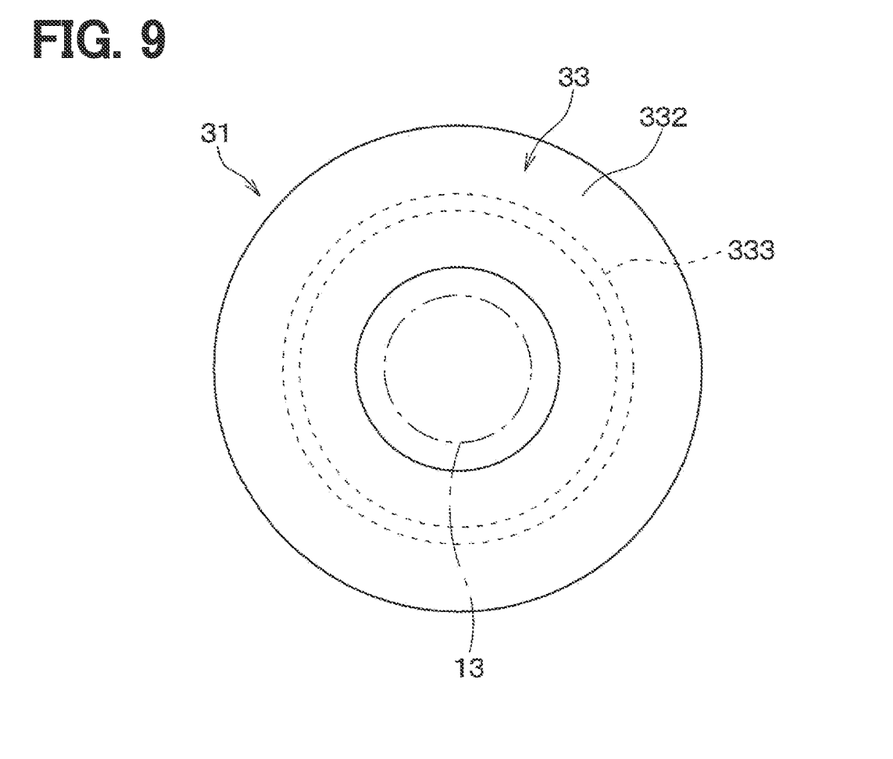
FIG. 9 is a view of the mounting ring taken in a direction of an arrow IX in FIG. 8.

As shown in FIG. 9, the projection 333 of the one-side plate portion 33 is shaped in a ring form such that the projection 333 surrounds the outer peripheral surface of the rotatable shaft 13. FIG. 9 shows the surface 332 of the one-side plate portion 33 which is opposite to the seal member 30. Although not depicted, the projection 343 of the opposite-side plate portion 34 is shaped in a circular ring form like the projection 333 of the one-side plate portion 33. The projection 343 of the opposite-side plate portion 34 is placed at a position where the projection 343 is opposed to the projection 333 of the one-side plate portion 33 in the axial direction D1.

According to the present embodiment, a compression ratio of the seal member 30 can be increased in comparison to a case where the projections 333, 343 are absent while the rest of the structure of the mounting ring 31, which is other than the presence or absence of these projections, is the same as that of the present embodiment. Thus, it is easy to ensure the required compression ratio of the seal member 30, which is required to limit the penetration of the gas through the gap between the seal member 30 and the mounting ring 31. Therefore, even when the wrinkles are generated at the opposite-side plate portion 34 at the time of forming the opposite-side plate portion 34 by bending the cylindrical tubular portion 312 through the press drawing process, the penetration of the gas through the gap between the seal member 30 and the mounting ring 31 can be limited.

The projection 343 of the opposite-side plate portion 34 may not be opposed to the projection 333 of the one-side plate portion 33 in the axial direction D1. Furthermore, among the one-side plate portion 33 and the opposite-side plate portion 34, only the one-side plate portion 33 may have the single projection 333. Furthermore, among the one-side plate portion 33 and the opposite-side plate portion 34, only the opposite-side plate portion 34 may have the single projection 343.

Fifth Embodiment

Figure 10:
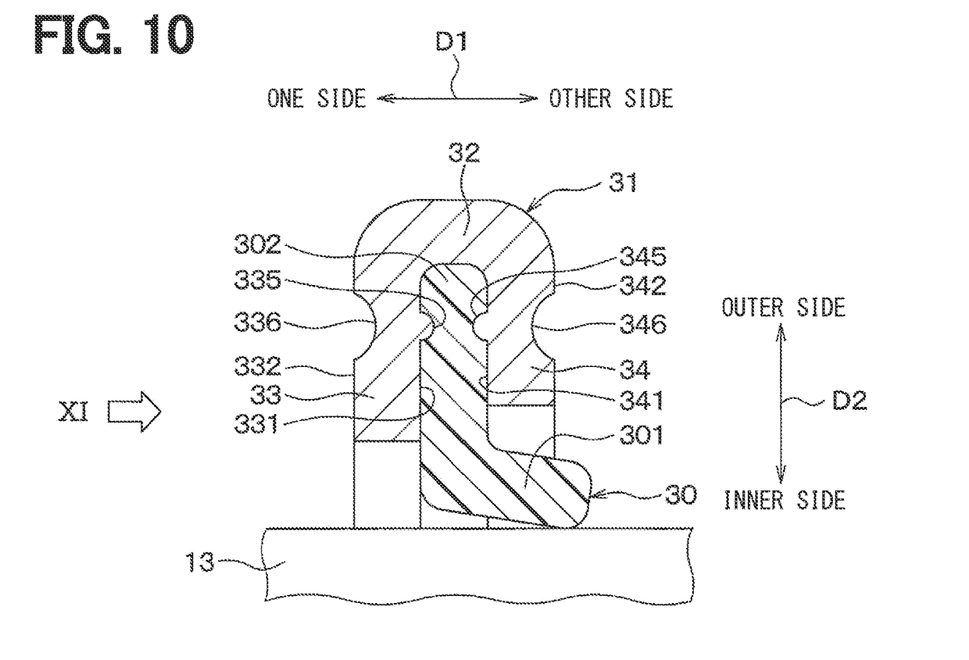
FIG. 10 is a cross-sectional view of a seal member and a mounting ring according to a fifth embodiment.
Figure 11:
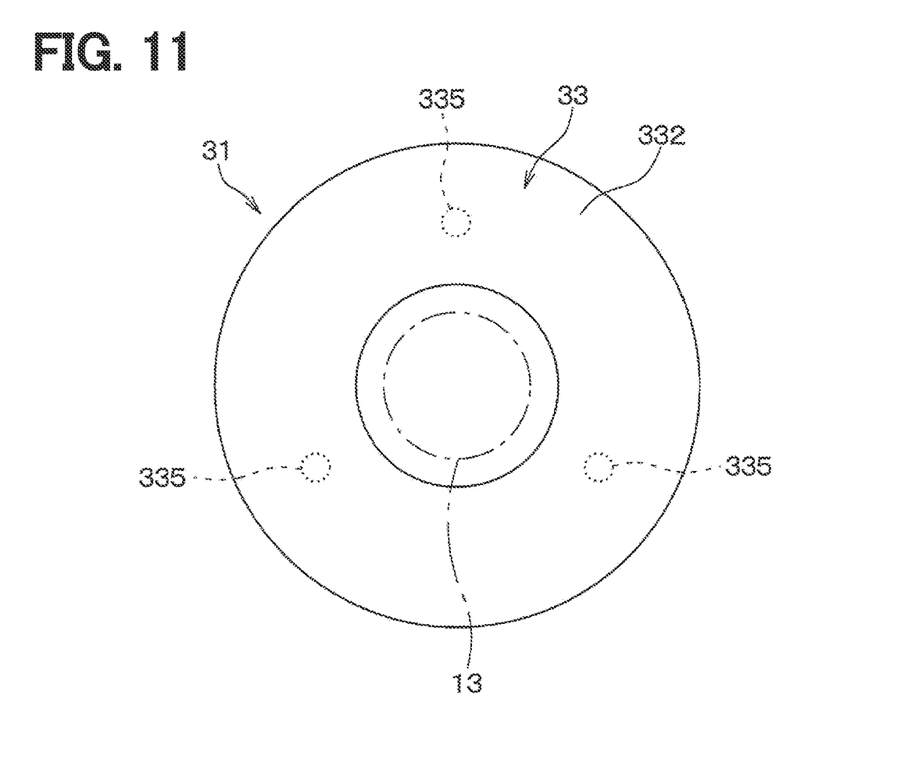
FIG. 11 is a view of the mounting ring taken in a direction of an arrow XI in FIG. 10.

As shown in FIGS. 10 and 11, in the present embodiment, each of the one-side plate portion 33 and the opposite-side plate portion 34 of the mounting ring 31 has a plurality of projections 335, 345 at the surface 331, 341 thereof, which is located on the side where the seal member 30 is placed. Like in the fourth embodiment, the plurality of projections 335, 345 are formed in each of the one-side plate portion 33 and the opposite-side plate portion 34 by forming a plurality of recesses 336, 346 at the opposite surface 332, 342 of each of the one-side plate portion 33 and the opposite-side plate portion 34 which is opposite to the seal member 30.

As shown in FIG. 11, the projections 335 of the one-side plate portion 33 are spaced from each other and are arranged in the circumferential direction of the rotatable shaft 13. Although not depicted in the drawing, like the projections 335 of the one-side plate portion 33, the projections 345 of the opposite-side plate portion 34 are spaced from each other and are arranged in the circumferential direction of the rotatable shaft 13. Each of the projections 345 of the opposite-side plate portion 34 is placed at a position where the projection 345 is opposed to a corresponding one of the projections 335 of the one-side plate portion 33 in the axial direction D1. Each of the projections 335, 345 is shaped in a circular form. However, each of the projections 335, 345 may be shaped in an elongated form that is elongated in the circumferential direction.

Even in the present embodiment, the advantages, which are similar to those of the fourth embodiment can be achieved. Each of the projections 345 of the opposite-side plate portion 34 may not be opposed to the corresponding one of the projections 335 of the one-side plate portion 33 in the axial direction D1. Furthermore, among the one-side plate portion 33 and the opposite-side plate portion 34, only the one-side plate portion 33 may have the projections 335. Also, among the one-side plate portion 33 and the opposite-side plate portion 34, only the opposite-side plate portion 34 may have the projections 345.

Other Embodiments (1) In the above embodiments, the seal member 30 is made of the fluorocarbon resin. Alternatively, the seal member 30 may be made of another type of synthetic resin which is other than the fluorocarbon resin. Furthermore, the seal member may be made of another type of material, such as synthetic rubber, which has a sealing function.

(2) In the above embodiments, the mounting ring 31 is made of the metal material. Alternatively, the mounting ring 31 may be made of another type of material which is other than the metal material and has excellent corrosion resistance.

(3) In the above embodiments, at least a portion of the outer peripheral surface 322 of the ring portion 32 of the mounting ring 31 is the cylindrical surface. Alternatively, the outer peripheral surface 322 of the ring portion 32 may not be the cylindrical surface. The mounting ring 31 may be fixed to the housing 11 in the state where the outer peripheral surface 322 is in line contact with the inner wall surface 161 of the housing 11 which forms the receiving space 16.

(4) The valve device 10 of each of the above embodiments is used in the application where the flow rate of the exhaust gas of the internal combustion engine, which flows toward the intake air passage of the internal combustion engine, is increased or decreased. Alternatively, the valve device of the present disclosure may be used in another type of application where the flow rate of the exhaust gas of the internal combustion engine is increased or decreased. Further alternatively, the valve device of the present disclosure may be used in another type of application where a flow rate of gas, which is other than the exhaust gas, is increased or decreased. In such a case, a type and a position of the bearing 14 may be different from those of the first embodiment. Furthermore, another type seal member, which is other than the seal member 30, may be provided.

(5) The present disclosure is not limited to the above-described embodiments, and each of the above-described embodiments may be changed as appropriate, and the present disclosure may include various modifications and modifications within an equivalent range. Further, the above embodiments are not unrelated to each other and can be appropriately combined unless the combination is clearly impossible. Needless to say, in each of the above-described embodiments, the elements of the embodiment are not necessarily essential except when it is clearly indicated that they are essential and when they are clearly considered to be essential in principle. In each of the above embodiments, when a numerical value such as the number, numerical value, amount, range or the like of the constituent elements of the embodiment is mentioned, the present disclosure should not be limited to such a numerical value unless it is clearly stated that it is essential and/or it is required in principle. In each of the above embodiments, when the material, the shape, the positional relationship or the like of the constituent elements of the embodiment is mentioned, the present disclosure should not be limited the material, the shape, the positional relationship or the like unless it is clearly stated that it is essential and/or it is required in principle.

What is claimed is:

1. A valve device comprising:
a housing that has a gas flow passage and a receiving space formed at an inside of the housing, wherein the gas flow passage is configured to conduct gas, and the receiving space is communicated with the gas flow passage;
a valve element that is installed at the gas flow passage and is configured to adjust an opening degree of the gas flow passage;
a rotatable shaft that is received in the receiving space and is configured to rotate about an axis of the rotatable shaft to rotate the valve element;
a seal member that is placed around an outer peripheral surface of the rotatable shaft in the receiving space and is slidably in close contact with the outer peripheral surface of the rotatable shaft to limit penetration of the gas through a gap between the rotatable shaft and the housing; and a mounting ring that is shaped in a ring form and is placed around the outer peripheral surface of the rotatable shaft in the receiving space to mount the seal member to the housing, wherein:

an outer peripheral end portion of the seal member is shaped in a planar plate form and extends from an inner side, at which the rotatable shaft is placed, toward an outer side in a radial direction of the rotatable shaft;

the mounting ring, which is shaped in the ring form, has an inner peripheral surface and an outer peripheral surface and also has:

a ring portion which is placed around an outer peripheral end of the seal member;

a one-side plate portion which is shaped in a plate form and is joined to one end part of the ring portion located on one side in an axial direction of the rotatable shaft while the one-side plate portion extends from the ring portion toward the inner side in the radial direction; and an opposite-side plate portion which is shaped in a plate form and is joined to an opposite end part of the ring portion located on an opposite side that is opposite to the one end part in the axial direction while the opposite-side plate portion extends from the ring portion toward the inner side in the radial direction;

the outer peripheral end portion of the seal member, which includes the outer peripheral end of the seal member, is entirely clamped between the one-side plate portion and the opposite-side plate portion in the axial direction;

the ring portion is fixed to an inner wall surface of the housing which forms the receiving space; and the ring portion, the one-side plate portion and the opposite-side plate portion are formed integrally in one-piece as the mounting ring, which has a "U"-shape in a cross-section parallel to the axial direction, from a single continuous plate material.

2. The valve device according to claim 1, wherein:
at least one of the one-side plate portion and the opposite-side plate portion has a single projection at a surface of the at least one of the one-side plate portion and the opposite-side plate portion located on a side where the seal member is placed; and
the single projection is shaped in a ring form such that the single projection surrounds the outer peripheral surface of the rotatable shaft.

3. The valve device according to claim 1, wherein:
at least one of the one-side plate portion and the opposite-side plate portion has a plurality of projections at a surface of the at least one of the one-side plate portion and the opposite-side plate portion located on a side where the seal member is placed; and
the plurality of projections are arranged and are spaced from each other in a circumferential direction of the rotatable shaft.

4. The valve device according to claim 1, wherein:
at least a portion of the outer peripheral surface of the ring portion, which extends in the axial direction, is a cylindrical surface that has a constant diameter; and
an entire circumferential region of the cylindrical surface is in surface-to-surface contact with the inner wall surface of the housing.

5. A method for manufacturing the valve device of claim 1, comprising:
preparing a plate material that is a member for forming the mounting ring, wherein the plate material is shaped in a planar plate form and has an opening that extends through the plate material;
forming the one-side plate portion and a cylindrical tubular portion, which are joined together, by bending the plate material;
preparing the seal member that has an opening which extends through the seal member while at least the outer peripheral end portion of the seal member is shaped in the planar plate form;
holding the seal member with the mounting ring by bending an entire circumferential region of the cylindrical tubular portion in a state where the outer peripheral end portion of the seal member is overlapped with a part of the one-side plate portion placed adjacent to the cylindrical tubular portion and thereby forming the ring portion and the opposite-side plate portion such that the seal member is clamped between the one-side plate portion and the opposite-side plate portion;
assembling the mounting ring to the housing by press-fitting the mounting ring, which holds the seal member, to the inner wall surface of the housing which forms the receiving space; and
assembling the rotatable shaft to the housing by inserting the rotatable shaft through the opening of the seal member.

6. The method according to claim 5, wherein the holding of the seal member with the mounting ring includes bending the cylindrical tubular portion by a press-drawing process or a spin swaging process.

7. The method according to claim 5, wherein:
the plate material, which is prepared in the preparing of the plate material, has a pair of major surfaces, wherein an outer peripheral end of each of the pair of major surfaces has a plurality of recesses which are arranged and are spaced from each other in a circumferential direction of the outer peripheral end; and
the holding of the seal member with the mounting ring includes bending the cylindrical tubular portion by a press-drawing process.

8. The method according to claim 5, wherein the holding of the seal member with the mounting ring includes forming the opposite-side plate portion by bending the cylindrical tubular portion to clamp the seal member between the opposite-side plate portion and the one-side plate portion such that the opposite-side plate portion is urged against the seal member in a state where the opposite-side plate portion is curved, and an end part of the opposite-side plate portion is spaced from the seal member.

* * * * *